United States Patent [19]

Peterson

[11] Patent Number: 4,914,280
[45] Date of Patent: Apr. 3, 1990

[54] OPTICAL WAND INTERFACE TO FIXED SCANNER

[75] Inventor: Donald S. Peterson, Philomath, Oreg.
[73] Assignee: Spectra-Physics, Inc., San Jose, Calif.
[21] Appl. No.: 259,890
[22] Filed: Oct. 19, 1988
[51] Int. Cl.⁴ .............................................. G06K 7/10
[52] U.S. Cl. .................................. 235/472; 235/454; 235/474
[58] Field of Search ........................ 235/454, 472, 474

[56] References Cited

U.S. PATENT DOCUMENTS 4,694,182 9/1987 Howard .
4,766,297 8/1988 McMillan ............................ 235/472

Primary Examiner—Harold I. Pitts
Attorney, Agent, or Firm—Killworth, Gottman, Hagan & Schaeff

[57] ABSTRACT

An optical wand interface for coupling electrical output signals representative of a bar code scanned by an optical wand to a fixed bar code scanner with no electrical connection for the signals comprises circuitry for amplifying the output signals from the wand and a light emitter for generating light signals representative of the output signals. The amplifier and light emitter are supported within a housing which includes an optical lens for focusing the light signals generated by the light emitter into the optical input window of the fixed bar code scanner when the housing is positioned thereon. In this way, the electrical output signals generated by an optical wand are converted into light signals which are passed directly to and can be processed by the conventional optical receiving portion of a fixed bar code scanner.

8 Claims, 1 Drawing Sheet

OPTICAL WAND INTERFACE TO FIXED SCANNER

BACKGROUND OF THE INVENTION

The present invention relates generally to the use of optical scanning wands with fixed bar code scanners and, more particularly to an electrically isolated interface for coupling electric output signals representative of a bar code scanned by an optical wand to a fixed bar code scanner.

Point of sale bar code scanner systems are becoming more and more common in a wide variety of stores, both in the United States and abroad. Such systems scan and detect UPC, EAN, and JAN bar codes to provide not only pricing information for the sale of identified products, but also to provide data for inventory control, marketing analysis and the like. Such point of sale scanner systems are typically incorporated into a counter top. A sales clerk sweeps bar coded items across an input window of the scanner system through which laser scanning beams are projected to detect and read the bar codes.

While such fixed bar code scanners are very convenient for a large majority of products sold by many stores. Particularly grocery stores, more and more products, either due to the nature of the product or the packaging of multiple units are difficult for a sales clerk to position over the scanner. In these instances, it is most convenient to have an optical scanning wand associated with the fixed scanner such that data generated by moving the scanning wand over a bar code are passed to the fixed scanner the same as if the bar code was read by directly passing the bar code over the fixed scanner's input window.

Unfortunately, most of the fixed bar code scanners which are presently available and in use have no provision for connecting an optical wand to the scanners system and adding an electrical connection to such scanners is prohibitively expensive. Accordingly, there is a need for interfacing an optical wand to a fixed scanner with no electrical interconnection to permit an optical wand to be used to gather data for use by the fixed scanner.

SUMMARY OF THE INVENTION

This need is answered by the optical wand interface of the present invention which converts electrical output signals generated by an optical wand into light signals which are passed to and can be processed by the conventional optical receiving portion of a fixed scanner.

According to one aspect of the present invention, an electrically isolated interface for coupling electrical output signals representative of a bar code scanned by an optical wand to a fixed bar code scanner comprises circuit means for amplifying the output signals received from the optical wand and light emitting means connected to the circuit means for generating light signals representative of the output signals. Support means are provided for supporting the circuit means and the light emitting means such that the light signals are passed to an optical input of the fixed bar code scanner. The light emitting means may comprise a light emitting diode or laser diode and preferably, further comprises lens means for focusing light signals upon the optical input of the fixed bar code scanner. The circuit means may comprise a pair of inverters connected in tandem to buffer and amplify the output signals from the optical wand. To permit the interface of the present application and the associated optical wand to be interchangeable in case of failure of either unit, the interface preferably further comprises interconnect means for removably connecting an optical wand to the interface.

In its preferred form, the electrically isolated interface for coupling electric output signals representative of a bar code scanned by an optical wand to a fixed bar code scanner is battery powered, and hence further comprises a battery. In this prefered form, the support means comprises a housing such that the interface is entirely portable and is coupled to a fixed bar code scanner by placement of the housing on an input window of the scanner to project the light signals into the scanner input window.

It is an object of the present invention to provide an electrically isolated interface for coupling electrical output signals representative of a bar code scanned by an optical wand to a fixed bar code scanner with no electrical connection to the fixed scanner; to provide an electrically isolated interface for coupling electrical output signals representative of a bar code scanned by an optical wand to a fixed bar code scanner which interface is entirely portable and can be readily transferred from one fixed scanner to another; and to provide an electrically isolated interface for optically coupling electrical output signals representative of a bar code scanned by an optical wand to a fixed bar code scanner by means of the conventional optical input portion of the fixed scanner.

Other objects and advantages of the invention will be apparent from the following description, the accompanying drawings and the appended claims.

DETAILED DESCRIPTION OF THE INVENTION

Figure 1:
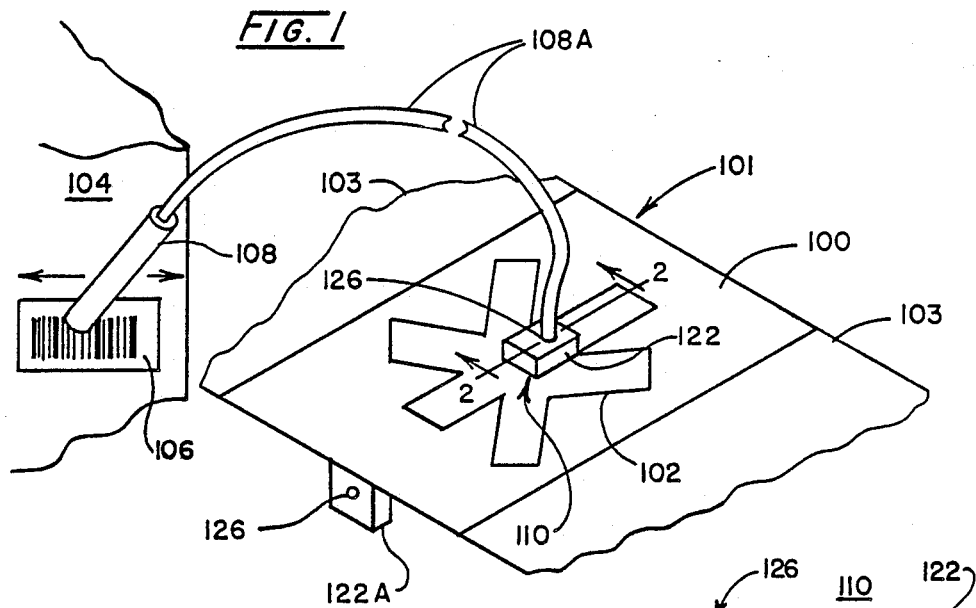
FIG. 1 is a perspective view of a fixed bar code scanner illustrating the electrically isolated interface of the present invention.
Figure 2:
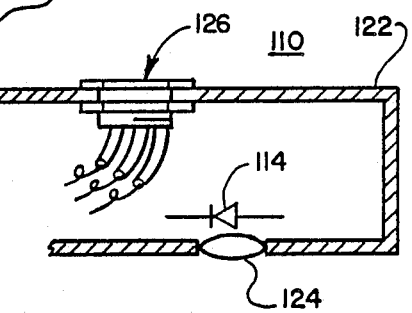
FIG. 2 is a broken away sectional view taken along the section line 2—2 of FIG. 1.
Figure 3:
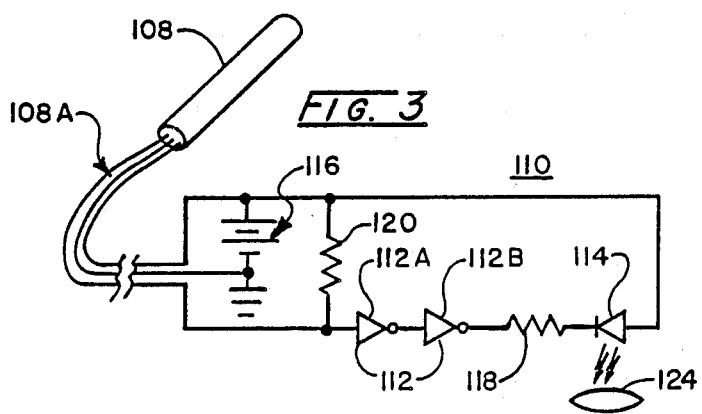
FIG. 3 is an electrical schematic diagram of a preferred embodiment of a portable electrically isolated interface in accordance with the present invention.

The upper surface 100 of a fixed bar code scanner 101 including an optical input window 102 is shown in FIG. 1. The optical scanner 101 is typically incorporated into the upper surface of a checkout counter 103 of a retail store. Normally a sales clerk would pass a bar code to be scanned over the window 102 such that a laser beam scanner, which forms no part of the present invention, can scan and detect the bar code data. Such data is used to generate pricing information as well as for inventory control, merchandising, operations and the like.

In many stores utilizing fixed scanners, products to be sold, represented by a portion of a large box 104, are brought to the checkout counter 103 including the fixed scanner 101. For such large or unmanageable objects, it is difficult if not impossible for the sales clerk to pass an affixed bar code 106 over the optical input window 102 of the fixed scanner 101. Accordingly, the sales clerk is forced to manually enter the code which is time consuming when compared to optically scanning the data represented by the bar code 106.

For such applications, it is desirable to optically scan the bar code 106 without physically positioning the product 104 such that the bar code 106 passes over the optical input window 102. In these instances, it is convenient to utilize an optical wand 108 which generates electrical output signals representative of the bar code 106 when the optical wand 108 is scanned across the bar code 106.

Unfortunately, many commercially available and presently deployed fixed bar code scanners do not have provision for electrically connecting the optical wand 108 to the circuitry of the bar code scanners. Accordingly, manual entry must be continued. In accordance with the present invention, an electrically isolated interface 110 couples the electrical output signals representative of a bar code scanned by the optical wand 108 to the fixed bar code scanner 101.

The interface 110 comprises circuit means which in the illustrated embodiment comprises a pair of inverters 112 which are connected in tandem to buffer and amplify the electrical output signals. Suitable amplifiers are commercially available from Motorola under Part No. MC 14584. Light emitting means comprising a laser diode or light emitting diode 114 is connected to the circuit means for generating light signals representative of the electrical output signals from the optical wand 108. A suitable light emitting diode is available from Hewlett-Packard as Part No. HLMP-D105. The diode 114 is connected between the positive side of a battery 116 and the output of the second inverter 112B via a resistor 118. A second resistor 120 is connected between the positive side of the battery 116 and the input to the first inverter 112A.

Support means, comprising a housing 122 in the preferred embodiment, provide for supporting the circuit means and the light emitting means such that the light signals generated by the light emitting means are passed to an optical input of the fixed bar code scanner 101. As shown in FIG. 1, a totally portable unit can be provided which is battery powered and coupled to the fixed scanner 101 by simply placing the housing 122 onto the optical input window 102 of the fixed scanner 101 with the light emitting means positioned to direct light signals through the window 102. Alternately, the housing 122A may be mounted beneath the top cover 100 of the fixed scanner 101 and positioned such that the light signals generated by the light emitting means are passed to collection mirrors of the fixed scanner 101 beneath the upper plate 100 of the fixed scanner 101.

For such internal installation of the electrically isolated interface of the present invention, it should be apparent that the support means can be simplified such that it does not comprise a housing and further the interface could be operated from the power supply of the fixed bar code scanner 101. However, such fixed installations require a dedicated interface per scanner and do not permit the flexibility of the totally portable unit previously described.

Preferably, the light signals generated by the light emitting means of the interface are focused by lens means 124 to more precisely direct the light signals to the optical input of the fixed bar code scanner 101. To add to the versatility of the interface 110 of the present invention, it preferably further comprises interconnect means which, in the illustrated embodiment, is an electrical connector 126 to permit an interconnecting cable 108A of the optical wand 108 to be removably connected to the interface 110. In this way, replacements readily can be provided for the optical wand 108 and for the interface 110 such that convenient wand scanning can be quickly resumed in the event of failure of either the optical wand 108 or the interface 110.

Having described the invention in detail and by way of reference to preferred embodiments thereof, it will be apparent that other modifications and variations are possible without departing from the scope of the invention defined in the appended claims.

What is claimed is:

1. An electrically isolated interface for coupling electrical output signals representative of a bar code scanned by an optical wand to a fixed bar code scanner comprising:
   circuit means for amplifying said output signals received from said optical wand;
   light emitting means connected to said circuit means for generating light signals representative of said output signals; and
   support means for supporting said circuit means and said light emitting means such that said light signals are passed to an optical input of the fixed bar code scanner.

2. An electrically isolated interface for coupling electrical output signals representative of a bar code scanned by an optical wand to a fixed bar code scanner as claimed in claim 1 wherein said light emitting means comprises a light emitting diode.

3. An electrically isolated interface for coupling electrical output signals representative of a bar code scanned by an optical wand to a fixed bar code scanner as claimed in claim 2 wherein said light emitting means further comprises lens means for focusing said light signals upon the optical input of said fixed bar code scanner.

4. An electrically isolated interface for coupling electrical output signals representative of a bar code scanned by an optical wand to a fixed bar code scanner as claimed in claim 1 wherein said light emitting means comprises a laser diode.

5. An electrically isolated interface for coupling electrical output signals representative of a bar code scanned by an optical wand to a fixed bar code scanner as claimed in claim 4 wherein said light emitting means further comprises lens means for focusing said light signals upon the optical input of said fixed bar code scanner.

6. An electrically isolated interface for coupling electrical output signals representative of a bar code scanned by an optical wand to a fixed bar code scanner as claimed in claim 1 wherein said circuit means comprises a pair of inverters connected in tandem.

7. An electrically isolated interface for coupling electrical output signals representative of a bar code scanned by an optical wand to a fixed bar code scanner as claimed in claim 1 wherein said interface is battery powered, further comprises a battery and said support means comprises a housing whereby said interface is portable and is coupled to the fixed bar code scanner by placement of the housing on an input window of the scanner to project said light signals thereinto.

8. An electrically isolated interface for coupling electrical output signals representative of a bar code scanned by an optical wand to a fixed bar code scanner as claimed in claim 1 wherein said interface further comprises interconnect means for removably connecting an optical wand to said interface.

* * * * *